Dec. 16, 1941.  J. HARMAN-ASHLEY  2,266,031
SOLVENT RECOVERY APPARATUS
Filed June 15, 1940

INVENTOR
John Harman-Ashley
BY Ward Crosby & Ind
ATTORNEYS

Patented Dec. 16, 1941

2,266,031

UNITED STATES PATENT OFFICE 2,266,031

SOLVENT RECOVERY APPARATUS

John Harman-Ashley, Caldwell, N. J.

Application June 15, 1940, Serial No. 340,859

4 Claims. (Cl. 183—4)

Solvent recovery apparatus is well known by which solvent laden air or gas may be conducted through adsorber tanks or units having solvent adsorption beds consisting of so-called activated carbon or the like, a battery of adsorber units being usually used in such manner that while one unit is in solvent adsorbing phase, steam or other equivalent heating fluid may be passed through the adsorption bed of the other unit, the solvents thus freed from the latter adsorption unit being passed therefrom along with the steam to a condenser and from thence to a decanter where the recovered solvent is separated out. Solvent recovery apparatus of the above type has been used for many purposes and has been characteristically so complicated and expensive as to be economical only where quite large volumes of solvent laden gases were to be treated.

The present invention relates to solvent recovery apparatus of the above mentioned character and has for one of its objects to provide a solvent adsorption bed supporting structure of such construction and relation to the adsorber tank as to have substantial advantages from the standpoint of efficiency and uniformity of action upon the solvent laden gases, a general object of the invention being to provide a solvent recovery apparatus which will be sufficiently simple and economical in cost, and yet sufficiently efficient in its action to make its use feasible in the dry cleaning industry and other plants where the volume of recoverable solids is so small that solvent recovery apparatus of the previous types has been too costly and complicated to be practical. Among other objects the invention aims to provide valve construction for solvent recovery apparatus of the above character which is improved from the standpoint of simplicity and cost and yet is effective in operation.

Further objects and advantages of the invention will be in part obvious and in part specifically referred to in the specification hereinafter contained which, taken in conjunction with the accompanying drawing, discloses a preferred embodiment thereof; such embodiment, however, should be considered only as illustrative of the principles of the invention in its broader aspects. In the drawing—

Fig. 5 is a detail section showing an auxiliary valve mechanism preferably used in conjunction with the valve constructions above referred to.

Figure 1:
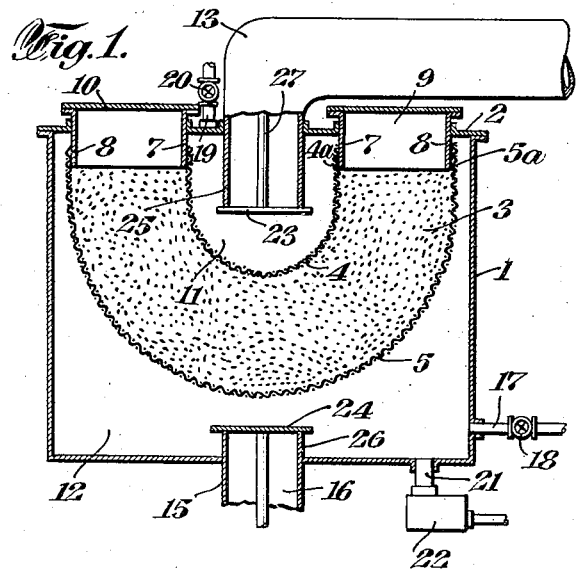
Fig. 1 is a central vertical section taken through an adsorber unit constructed in accordance with the invention.

Referring more particularly to Fig. 1, the invention is illustrated as applied to an adsorber tank 1 which may be of cylindrical metal construction, and having a top cover 2 suitably secured to the body of the tank.

In accordance with one preferred feature of the invention I employ a solvent adsorption bed of what may be termed a dome shaped or basket-like configuration, the illustrated solvent adsorption bed 3 which will usually be of activated carbon, being held in position by spaced screen members which have dome shaped or hemispherical portions 4 and 5 respectively, which are located substantially concentrically one within the other, so that the solvent adsorption bed is retained between them. The solvent laden gases pass through the activated carbon bed from one face to the other and a bed of the above construction provides paths of substantially uniform resistance to flow of the gases, irrespective of the particular point at which they may enter the bed. The arch shape of the bed also tends to keep it in its original shape without sagging or slumping, and a large area of exposure of the gases to the bed is provided with relatively small volume or displacement of the bed.

In the illustrated form of the invention the screen members above referred to also have upwardly extending annular screen portions 4a and 5a respectively, which are suitably fastened to inner and outer rings 7 and 8 secured to the cover 2 of the tank and affording an annular opening 9 at the top through which access may be readily had to the solvent adsorption bed for purposes of repair or replacement. These rings 7 and 8 are made imperforate, to avoid short-circuiting of the gases around the carbon bed. As shown an annular plate 10 detachably secured in suitable manner to the rings 7 and 8, normally seals the activated carbon bed 3 from the outer air. Thus the carbon bed supporting structure is preferably supported or suspended from the cover 2 of the tank and may be removed from the tank along with the cover whenever desired. I prefer also to space the solvent adsorbent bed supporting structure from the side and bottom walls of tank 1 in order that any condensate collecting on these walls will not be adsorbed into the bed 3. Thus the main walls of the tank will not have to be made of corrosion resisting metal when vapors are being treated which when subjected to steam and carbon might act corrosively during the treatment.

The bed 3 of activated carbon thus divides the interior of tank 1 into two chambers 11 and 12, into one of which the solvent laden gases to be treated are led, and from the other of which the gases are exhausted after giving up their solvent content to the bed 3 while passing therethrough. In the illustrated form of the invention the solvent laden gases are led into chamber 11 through an intake conduit 13 passing through an opening 14 in the cover 2 of the tank, and after passing through the bed 3 the gases are exhausted by means of offtake pipe 15 passing through an opening 16 in the bottom wall of tank 1. Steam for separating the solvents from bed 3 may be led into chamber 12 by suitable pipe 17 having a valve 18 therein, and the steam carrying the solvents freed from the bed 3 may be led to a condenser (not shown) by a pipe 19 having a valve 20 therein. Condensate collecting within tank 1 may be drawn off through a pipe 21 connected to the bottom of the tank and leading to a suitable condensate trap indicated diagrammatically at 22.

The valves 18 and 20 of course are closed during the adsorption phase in which conduits 13 and 15 are open, and in the bed heating phase in which the solvents are freed from the bed, the conduits 13 and 15 are closed off from the adsorption tank 1, valves 18 and 20 being then open. The valve mechanisms for opening and closing communication between conduits 13 and 15, and the interior of tank 1, preferably utilize plate members 23 and 24 located respectively in the chambers 11 and 12, and seating respectively (with appropriate interposed packing not shown or described in detail) against the inwardly projecting annular walls 25 and 26, extending respectively from conduits 13 and 15 into the interior of tank 1. Thus the positive pressures existing within chambers 11 and 12 during the phase of operation when valve members 23 and 24 are closed, assist in firmly sealing these valve members against the valve seats constituted by members 25 and 26. The valve plates 23 and 24 may be moved by actuating rods 27 and 28 respectively within the conduits 13 and 15.

Figure 2:
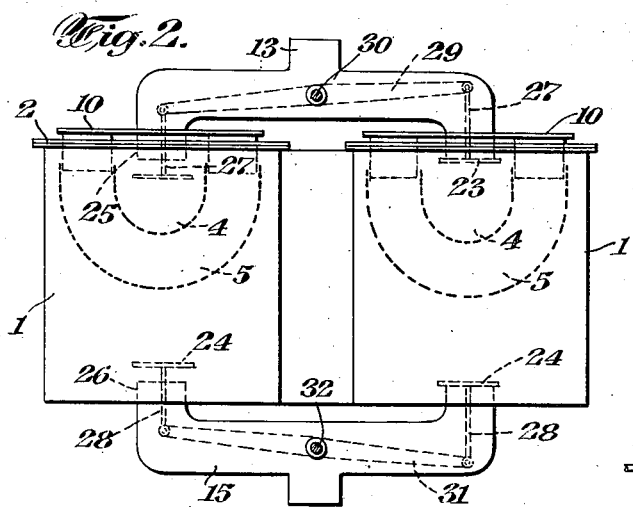
Fig. 2 is a side elevation showing a pair of adjacent adsorber units, and illustrating preferred valve mechanism to be used in connection therewith.
Figure 4:
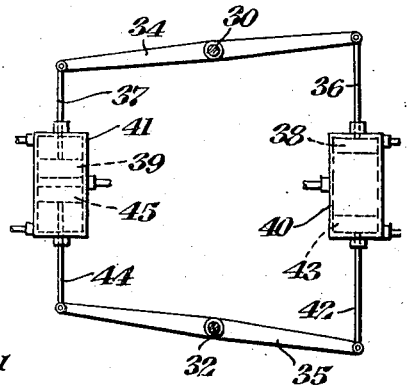
Fig. 4 is a section through shafts 30, 32 of Fig. 3, looking toward, and showing a preferred valve operating mechanism.
Figure 3:
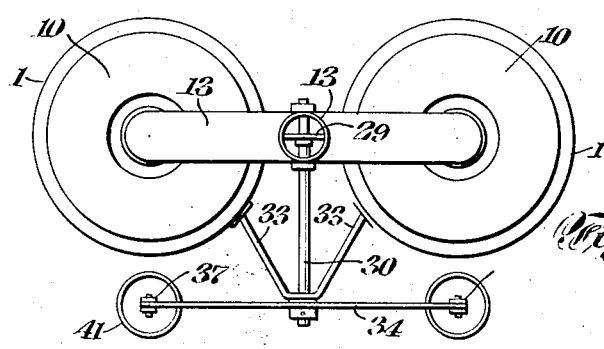
Fig. 3 is a top plan view of the pair of adsorber units shown in Fig. 2.

In Figs. 2 to 4 I have shown more in detail suitable valve operating mechanism for controlling the valves 23 and 24. Fig. 2 shows a pair of adsorbent units each consisting of a tank 1 and associated parts previously described, connected to solvent laden gas intake conduit 13 and exhaust gas conduit 15. As shown in Fig. 2 the plate valve actuating rod 27 may be pivoted to a walking beam 29 located in the conduit 13 and connected to an oscillating shaft 30 suitably journalled in such conduit. The actuating rod 28 of the plate valve 24 is likewise pivoted to a similar walking beam 31 located in exhaust gas conduit 15 and fixed to an oscillating shaft 32 suitably journaled in said conduit. Now referring more particularly to Figs. 3 and 4, the oscillating shaft 30, after passing through a suitable bearing bracket 33 extending from the adjacent tanks 1, is shown as fixed to a rocking lever 34, the shaft 32 being likewise fixed to a rocking lever 35. The opposite ends of the rocking lever 34 are coupled by connecting rods 36 and 37 (Fig. 4) to pistons 38 and 39 operating respectively in pneumatic cylinders 40 and 41. The opposite ends of the rocking lever 35 are likewise coupled respectively by connecting rod 42 to piston 43 operating in pneumatic cylinder 40, and a connecting rod 44 connected to piston 45 operating in pneumatic cylinder 41.

Figure 5:
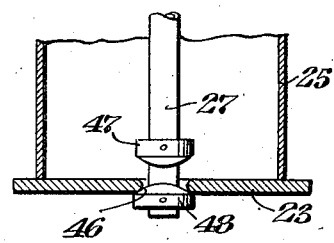

By suitable pilot valve mechanism (not illustrated or described in detail since suitable forms thereof are well known) fluid under pressure may be admitted and exhausted selectively from cylinders 40 and 41, to position the plate valves 23 and 24 either in the phase shown in Fig. 2 wherein the left hand tank 1 is in solvent-adsorbing phase and the tank 1 at the right of Fig. 2 is in the phase where steam is being admitted through pipe 17 and steam carrying solvent vapors is passing out of tank 1 through pipe 19. Or alternatively the valve operating mechanism shown diagrammatically in Fig. 4, may be set in the opposite position wherein valves 23 and 24 of the tank 1 at the right of Fig. 2 will be open, and the corresponding valves of the tank 1 at the left of Fig. 2 closed. The valve members and their immediate actuating parts are thus preferably incorporated directly into the tank structure proper, using a simple form of plate valve located inside of the tank and so related to its valve seat that the interior pressure assists in maintaining a seal when the valve is in closed position. I also prefer to use in conjunction with the valve plates 23 and 24, an auxiliary valve mechanism which serves to equalize the pressures on opposite sides of the valve plate when the latter is to be moved to open position. As exemplified in Fig. 5, the valve rod 28 may extend through a hole 46 in the plate valve 24, being provided with an enlarged head 47 adapted to seat (with appropriate interposed packing not shown or described in detail) against the opposite face of plate valve 24 when the valve is in closed position. As shown in Fig. 5 the valve rod 28 is also provided with a collar 48 which engages against the under surface of plate valve 24 after the valve rod 28 has been lifted to a slight extent, and removes the valve plate 24 from its seat. The initial movement of rod 28 opens the hole 46 through valve plate 24 and thus equalizes pressure on opposite sides of the valve plate before the latter is moved from closed position. The valve areas in apparatus of the type under discussion are necessarily relatively large, and in the above way simple plate valves may be actuated without undue strains or expenditure of power, and effectively sealed when closed, avoiding the extra space and expense of exterior valve constructions of the type heretofore employed in similar apparatus.

While the invention has been disclosed as to solvent recovery apparatus of a particular specific construction, it should be understood that many changes may be made therein without departing from the invention in its broader aspects, within the scope of the appended claims.

I claim:

1. Solvent recovery apparatus of the class described having a tank, and a solvent adsorption bed supporting structure including spaced screen members within said tank and having portions of substantially inverted dome shaped configuration and position, said dome shaped portions being substantially concentrically disposed, and valve mechanisms for admitting into and exhausting gases from within said tank, one of said valve mechanisms communicating with space within said dome shaped portions, and the other of said valve mechanisms communicating with the space without said dome shaped portions, said screen members being suspended from parts located at the upper portion of the tank in spaced relation to the side and bottom walls of the tank, whereby the inverted dome shape of said screen members largely supports the weight of the adsorptive bed without substantial sagging or slumping of said screen members.

2. Solvent recovery apparatus of the class described having a tank, and a solvent adsorption bed supporting structure including spaced screen members within said tank and having portions of substantially inverted dome shaped configuration and position, said dome shaped portions being substantially concentrically disposed, and valve mechanisms for admitting into and exhausting gases from within said tank, one of said valve mechanisms communicating with space within said dome shaped portions and the other of said valve mechanisms communicating with the space without said dome shaped portions, said bed supporting structure also having annular portions extending upwardly from said dome shaped portions to the top of the tank to provide a filling opening for said bed, said screen members being suspended from parts located at the upper portion of the tank in spaced relation to the side and bottom walls of the tank, whereby the inverted dome shape of said screen members largely supports the weight of the adsorptive bed without substantial sagging or slumping of said screen members.

3. Solvent recovery apparatus of the class described having a tank and a solvent adsorption bed supporting structure including spaced screen members one surrounding the other and located within said tank, said screen members being substantially of inverted dome-shaped configuration and position and having end and side walls substantially uniformly spaced, and valve mechanisms for admitting into and exhausting gases from within said tank, one of said valve mechanisms including a valve seat and valve member located within the space enclosed by the inner of said screen members and the other of said valve mechanisms communicating with the space without said screen members, said screen members being suspended from parts located at the upper portion of the tank in spaced relation to the side and bottom walls of the tank, whereby the inverted dome shape of said screen members largely supports the weight of the adsorptive bed without substantial sagging or slumping of said screen members.

4. Solvent recovery apparatus of the class described having a tank and a solvent adsorption bed supporting structure including spaced screen members one surrounding the other and located within said tank, said screen members being substantially of inverted dome-shaped configuration and position and having end and side walls substantially uniformly spaced, and valve mechanisms for admitting into and exhausting gases from within said tank, one of said valve mechanisms including a valve seat and valve member located within the space enclosed by said screen members and the other of said valve mechanisms communicating with the space without said screen members, said valve member comprising a plate movable downwardly within the space enclosed by the inner of said screen members to uncover its valve seat, and an actuating member for said valve plate which extends upwardly to the space above said screen members.

JOHN HARMAN-ASHLEY.